United States Patent Office 3,570,311
Patented Mar. 16, 1971

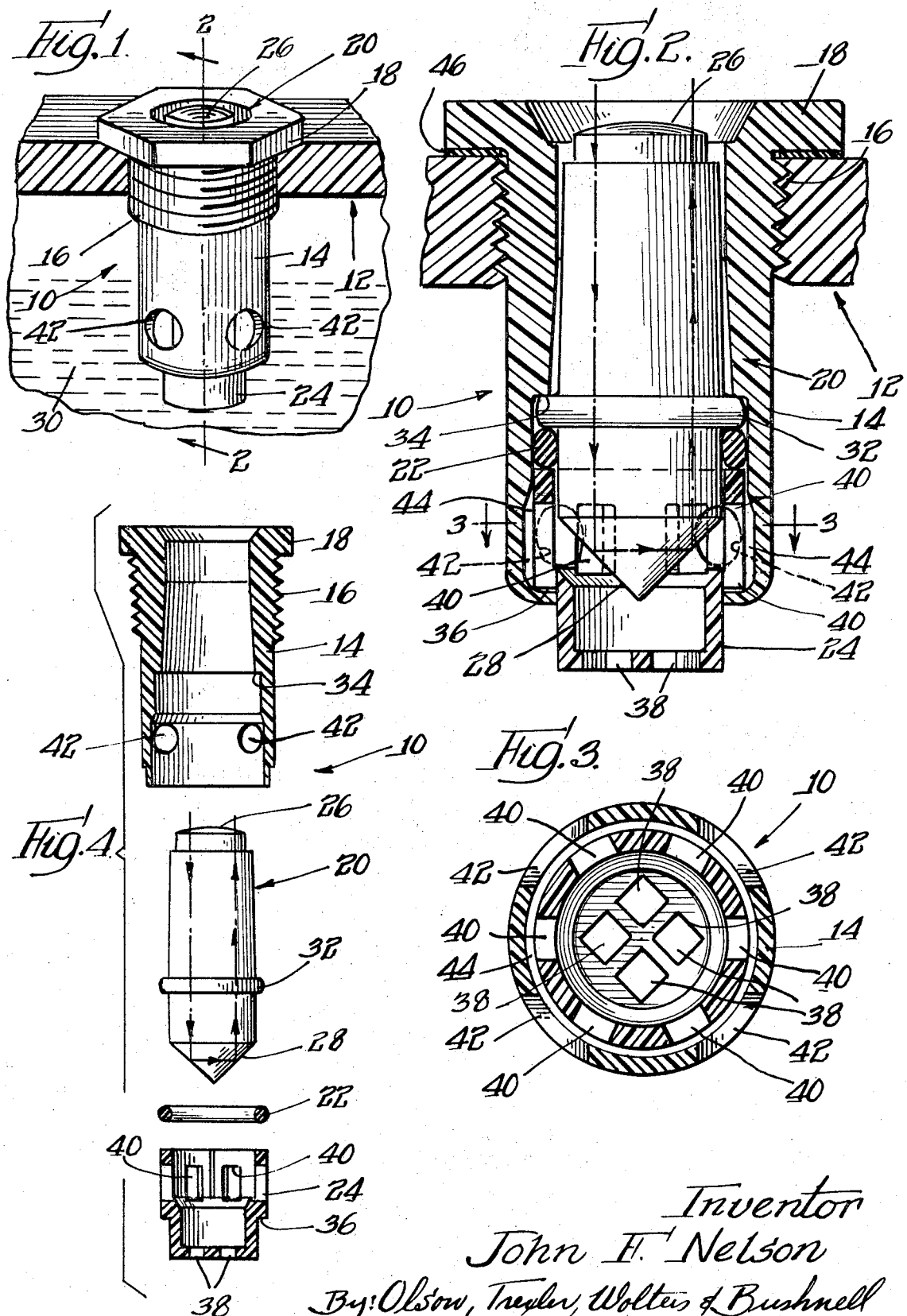

3,570,311
LIQUID LEVEL INDICATOR ASSEMBLY
John F. Nelson, Des Plaines, Ill., assignor to Illinois
Tool Works Inc., Chicago, Ill.
Filed Mar. 19, 1969, Ser. No. 808,569
Int. Cl. G01f 23/02
U.S. Cl. 73—327                                 5 Claims

ABSTRACT OF THE DISCLOSURE

An indicator assembly for indicating liquid levels includes a member of light transmitting material having a body section, the lower portion of which is immersible within liquid and the upper portion of which is exposed so as to provide a liquid level indicating surface. A prismatic surface arrangement associated with the lower portion of the body section is adapted to receive light rays from and reflect light rays to the upper exposed level indicating surface. The light transmitting member is held within an encompassing sleeve-like device which is open at one extremity in the vicinity of the exposed level indicating surface and open at the opposite extremity in the vicinity of the prismatic surface arrangement and includes a screen member attached thereto. The sleeve-like device is mounted in the upper wall of a liquid container.

DISCLOSURE

It is an object of the present invention to provide a level indicator assembly of the type set forth above which is particularly adaptable for use to optically indicate the level of liquid maintained under pressure within a container, such as a liquifiable, fluorinated hydrocarbon gas. One example is a gas which is commercially available under the trademark Freon.

More specifically, the present invention contemplates a level indicator assembly in which the light transmitting member is so associated within a sleeve-like device as to preclude unauthorized escape therethrough of liquid under pressure.

It is an object of the present invention to provide a plastice liquid level indicator assembly as set forth above which is extremely simple, yet sturdy in construction, and which operates efficiently to indicate the level of a liquified gas under pressure.

The foregoing and other objects and advantages will be more apparent when considered in connection with the accompanying drawing, wherein:

FIG. 1 is a perspective view showing a liquid level indicator assembly which is representative of one embodiment of the present invention, said assembly being shown in association with the upper wall of a container;

FIG. 2 is an enlarged, vertical central sectional view of the indicator assembly taken substantially along the line 2—2 of FIG. 1;

FIG. 3 is a horizontal sectional view taken substantially along the line 3—3 of FIG. 2; and FIG. 4 is an exploded view of the assembly illustrated in FIG. 2.

Referrring now to the drawing more in detail, wherein like numerals have been employed to designate similar parts throughout the various figures, it will be noted that the indicator assembly is designated generally by the numeral 10. In FIGS. 1 and 2, the indicator assembly 10 is disclosed in operative association with the upper wall of a container 12. The assembly 10 includes an elongate hollow or sleeve-like member 14, preferably formed of suitable, rigid plastic material. The upper external periphery of the member 14 is provided with thread convolutions 16 adapted to be accommodated by complementary thread convolutions in the upper wall of a container 12. A peripheral flange 18 is adapted to be sealingly clamped against the outer surface of the container 12 and is preferably polygonal in transverse cross-section in order to facilitate the application of a suitable turning tool or wrench (not shown). In FIG. 4, the sleeve-like member 14 is disclosed prior to the telescopic association therewith of an elongate indicator member 20 of a light transmitting material, a sealing or O-ring 22 and a thimble-like screen member 24.

The light transmitting indicator member 20 comprises a body section having a lower portion immersible within liquid and an upper portion providing an exposed liquid level indicating surface 26. Prismatic or conical surface means 28 is provided at the lower extremity of the member 20 and is so disposed with respect to the exposed level indicating surface 26 as to receive and reflect light on only the portion of the prismatic surface means 28 located above the level of the body of liquid indicated by the numeral 30, FIG. 1. Intermediate the opposite extremities of the light transmitting member 20 is an integral annular flange adapted to abut a complementary shoulder 34 provided along the inner periphery of the sleeve-like member 14.

After the light transmitting member 20 has been initially inserted within the lower open extremity of the sleeve-like member 14 so as to bring the flange 32 into engagement with the shoulder or abutment 34, the sealing ring 22 may be telescopically associated with the member 20 so as to engage the underside of the flange 32 as clearly shown in FIG. 2. The thimble-like screen member or section 24 may now be telescopically associated with the members 14 and 20 so as to engage the underside of the sealing ring 22. At this point the lower margin of the sleeve-like member 14 may be peened over so as to engage a shoulder 36 of the screen 24. It has been found practical to form the sleeve-like member 14 of suitable plastic material which, upon being heated at its lower extremity, will become sufficiently pliable to permit the aforesaid peening operation. Upon cooling, the plastic material will harden and the member 20, the sealing ring 22 and the screen 24 will be secured together as a unit.

It will also be noted that the screen member 24 is provided with four equally spaced, substantially square end apertures 38 as well as six equally spaced peripheral apertures 40. The lower portion of the sleeve-like member 14 is also provided with four equally spaced peripheral apertures 42 which communicate with the apertures 40 through an annular area or space 44 between the inner periphery of the member 14 and the outer periphery of the screen member 24. This arrangement of apertures 38, 40 and 42 and the annular space 44, serves to prevent foreign particles from entering into the area surrounding the conical or prismatic surface means 28.

From the foregoing, it will be apparent that if the liquid 30 within the container 12 occupies the level shown in FIG. 1, the level indicating surface 26 will appear dark. This is due to the fact that the prismatic surface means 28 is immersed, and hence the light rays received by the surface 26 are not reflected back to said surface. Due to the presence of the apertures 38, 40 and 42, liquid is free to enter the area surrounding the conical surface 28. If the level of the liquid 30 is positioned below the upper limits of the conical surface means 28, that portion of said surface means which is above the liquid level will receive light rays from and reflect light rays to the upper exposed indicating surface 26. When the level of the liquid is positioned below the lowermost limits of the conical or prismatic surface means 28, the entire area defined by the surface 26 will be illuminated by the light rays. Therefore, the area of the surface of 26 which is illuminated is proportional to the portion of the surface 28 that is located above the associated body of liquid.

As previously pointed out, the level indicator assembly of the present invention is particularly adapted for use with gases which are maintained in liquid form only under pressure. Hence it is very important that the assembly be completely sealed as by means of the O-ring 22, and preferably by the use of a sealing washer 46 positioned beneath the clamping surface of the flange 18. It has been found practical to form the casing or housing 14 of firm plastic mateiral. Thus the member 14 may be produced by conventional molding methods. The screen member 24 may be formed of similar material, and the light-transmitting material of the member 20 may be molded in one piece. As a result, the cost of production of the liquid level indicator assembly as contemplated by the present invention may be kept to a minimum. The structural form of the light transmitting member 20 may vary in accordance with the environment with which it is to be used. A light transmitting member and housing therefor of substantially circular cross-section, as disclosed herein, has proven to be commercially acceptable.

The invention is claimed as follows:

1. A level indicator assembly for indicating the level of liquid within a container including a member of light transmitting materal presenting a body section having a lower portion immersible within the liquid located in said container and an upper portion providing an exposed liquid level indicating surface, prismatic surface means associated with the lower body portion for receiving light rays from and reflecting light rays to said exposed level indicating surface in amounts proportional to the area of the portion of the prismatic surface means located above the level of an associated body of liquid in said container, a sleeve-like device encompassing said light transmitting member, said device having a through bore being open at one extremity in the vicinity of said exposed level indicating surface and open at the opposite extremity in the vicinity of said prismatic surface means, said bore having a predetermined diameter and further being provided with one or more counterbores each having a diameter greater than said predetermined diameter thereby forming at least one radially directed shoulder means in said bore, said body section having a diameter substantially complementary to said predetermined diameter, annular flange means integral with the body section and positioned intermediate the opposite extremities of said member of light transmitting material, annular sealing means positioned between and impinging on the outer periphery of the body section and the inner periphery of a counterbore of the sleeve-like device, said flange means and said sealing means adapted to cooperate with said shoulder means to axially position said member within said bore, a thimble-like screen member mounted within the lower portion of the counterbore of the sleeve-like device in the vicinity of said prismatic surface means, said sleeve-like device and said screen member being provided with cooperative means for retaining said sleeve-like device and screen member in assembled relation, means for mounting said sleeve-like device in the wall of a liquid container and said sleeve-like device having peripheral apertures for establishing liquid communication with said screen member thereby allowing the prismatic surface to be exposed to the liquid in the container while screening foreign matter from the prismatic surface means.

2. A device of the type claimed in claim 1 wherein said cooperative means for retaining said sleeve-like device and said screen member in assembled relation includes an inwardly directed flange on the lower extremity of said sleeve-like device and cooperative shoulder means on said screen member.

3. A device of the type claimed in claim 2 wherein said screen member extends axially beyond the lower extremity of said flanged sleeve-like device and said screen member is provided with restricted apertures in that portion extending beyond said lower extremity.

4. A device of the type claimed in claim 1 wherein said peripheral apertures in said sleeve-like device have a predetermined size, said screen member being radially spaced from said counterbore of said sleeve-like device and thereby providing an annular chamber between said device and member, and said screen member having a plurality of peripheral apertures greater in number and smaller in size than the peripheral apertures of said sleeve-like device thereby providing free access for the liquid to said prismatic surfaces but preventing access of foreign matter thereto.

5. A level indicator assembly for indicating the level of liquid within a container as set forth in claim 1, wherein the upper extremity of the sleeve-like device is provided with external thread convolutions for accommodating complementary internal thread convolutions of a liquid container.

References Cited

UNITED STATES PATENTS

| | | | |
|---|---|---|---|
| 1,680,174 | 8/1928 | Rhodes et al. | 73—326X |
| 3,069,908 | 12/1962 | Lonn | 73—327 |
| 3,085,424 | 4/1963 | Berg | 62—125UX |
| 3,088,811 | 5/1963 | Jones | 62—125UX |
| 3,184,971 | 5/1965 | Piasecki | 73—334 |
| 3,379,576 | 4/1968 | Matter | 73—334 |
| 3,397,808 | 8/1969 | Jones | 73—323X |
| 3,447,375 | 6/1969 | Fox, Jr. | 73—327 |
| 3,455,625 | 7/1969 | Brumley et al. | 350—96 |
| 1,381,005 | 6/1921 | Pitkin | 73—319X |
| 2,510,663 | 6/1950 | Schuessler | 116—118X |
| 3,498,141 | 3/1970 | Nelson et al. | 73—319 |

LOUIS R. PRINCE, Primary Examiner

D. M. YASICH, Assistant Examiner

U.S. Cl. X.R.

116—118